United States Patent
Shah et al.

(10) Patent No.: US 10,454,323 B2
(45) Date of Patent: Oct. 22, 2019

(54) PERMANENT MAGNET BASED ELECTRIC MACHINE AND METHOD OF MANUFACTURING THE SAME

(71) Applicant: GE Oil & Gas ESP, Inc., Oklahoma City, OK (US)

(72) Inventors: Manoj Ramprasad Shah, Latham, NY (US); Nathaniel Benedict Hawes, Ballston Spa, NY (US); James Pellegrino Alexander, Ballston Lake, NY (US); Patel Bhageerath Reddy, Niskayuna, NY (US)

(73) Assignee: GE Oil & Gas ESP, Inc., Oklahoma City, OK (US)

( * ) Notice: Subject to any disclaimer, the term of this patent is extended or adjusted under 35 U.S.C. 154(b) by 249 days.

(21) Appl. No.: 15/666,061

(22) Filed: Aug. 1, 2017

(65) Prior Publication Data
US 2018/0034329 A1    Feb. 1, 2018

Related U.S. Application Data

(60) Provisional application No. 62/369,216, filed on Aug. 1, 2016.

(51) Int. Cl.
*H02K 1/27* (2006.01)
*H02K 1/17* (2006.01)
(Continued)

(52) U.S. Cl.
CPC ............. *H02K 1/17* (2013.01); *F04D 13/10* (2013.01); *H02K 1/276* (2013.01); *H02K 1/278* (2013.01);
(Continued)

(58) Field of Classification Search
CPC ........................................... H02K 15/03
(Continued)

(56) References Cited

U.S. PATENT DOCUMENTS 4,529,900 A    7/1985  Uzuka
5,010,266 A *  4/1991  Uchida ............... H02K 1/2773
                                                 310/156.22
(Continued)

FOREIGN PATENT DOCUMENTS

CN       203942353 U    11/2014
DE    102008041555 A1 *  3/2010  ............. H02K 1/276
(Continued)

OTHER PUBLICATIONS

Zhou Zuncheng et al., "High-speed reluctance machines with mixed-pole windings", Electric Power Applications, IEE Proceedings B, vol. 138, Issue: 5, pp. 257-263, Sep. 1991.

*Primary Examiner* — Tran N Nguyen
(74) *Attorney, Agent, or Firm* — Crowe & Dunlevy, P.C.

(57) ABSTRACT

An electric machine is presented. The electric machine includes a stator and a rotor disposed concentric to the stator. At least one of the rotor and the stator includes a core including a plurality of laminates stacked along the axial direction of the electric machine, where the stacked plurality of laminates defines a plurality of axial slots. The at least one of the rotor and the stator further includes a permanent magnet assembly disposed in one or more of the plurality of axial slots, where the permanent magnet assembly includes two or more permanent magnets disposed serially along the axial direction of the electric machine such that adjacently disposed permanent magnets overlap one another to form an overlapped interface. The overlapped interface spans at least two laminates of the plurality of laminates of the core.

19 Claims, 11 Drawing Sheets

(51) Int. Cl.
  *H02K 15/03* (2006.01)
  *H02K 15/02* (2006.01)
  *F04D 13/10* (2006.01)
  *H02K 21/44* (2006.01)
  *F04D 13/08* (2006.01)
  *E21B 43/12* (2006.01)

(52) U.S. Cl.
  CPC ......... *H02K 1/2786* (2013.01); *H02K 15/024* (2013.01); *H02K 15/03* (2013.01); *H02K 21/44* (2013.01); *E21B 43/128* (2013.01); *F04D 13/086* (2013.01)

(58) Field of Classification Search
  USPC ................ 310/154.05, 154.06, 154.11, 310/156.48–156.82; 29/596–598
  See application file for complete search history.

(56) References Cited

U.S. PATENT DOCUMENTS

| | | | |
|---|---|---|---|
| 6,707,209 B2 * | 3/2004 | Crapo | H02K 1/278 310/154.01 |
| 8,148,864 B2 | 4/2012 | Yoshizawa et al. | |
| 8,468,681 B2 | 6/2013 | Helle et al. | |
| 8,541,919 B2 | 9/2013 | Lokhandwalla et al. | |
| 2006/0049709 A1 | 3/2006 | Noh | |
| 2009/0224619 A1 * | 9/2009 | Okubo | H02K 1/278 310/156.25 |
| 2011/0000079 A1 * | 1/2011 | Fukumaru | H02K 1/2766 29/598 |
| 2011/0079325 A1 * | 4/2011 | Doi | H02K 1/2766 148/108 |
| 2013/0069471 A1 | 3/2013 | Kadiri et al. | |
| 2013/0154449 A1 | 6/2013 | Shen | |
| 2013/0270956 A1 * | 10/2013 | Yamaguchi | H02K 1/27 310/156.27 |
| 2013/0285500 A1 * | 10/2013 | Kinashi | H02K 1/276 310/156.53 |
| 2013/0334910 A1 * | 12/2013 | Takahashi | H02K 9/22 310/52 |
| 2014/0300233 A1 * | 10/2014 | Arimatsu | H02K 1/278 310/156.12 |

FOREIGN PATENT DOCUMENTS

| | | | |
|---|---|---|---|
| JP | 2007215357 | * | 8/2007 |
| JP | 2009219314 | * | 9/2009 |
| JP | 2014121115 | * | 6/2014 |
| WO | 2015044369 A2 | | 4/2015 |

* cited by examiner

PERMANENT MAGNET BASED ELECTRIC MACHINE AND METHOD OF MANUFACTURING THE SAME

RELATED APPLICATIONS

This application claims the benefit of U.S. Provisional Patent Application No. 62/369,216 entitled "Permanent Magnet Based Electric Machine and Method of Manufacturing the Same," which was filed on Aug. 1, 2016, the disclosure of which is herein incorporated by reference.

BACKGROUND

Embodiments of the present specification relate to an electric machine, and more particularly to a permanent magnet based electric machine having a rotor and/or stator with enhanced mechanical balance and stress distribution.

As will be appreciated, the term electric machine is generally used to refer to a machine such as a motor or a generator having a rotor and a stator. Non-limiting examples of the electric machines include a radial field electric machine, an axial field electric machine, a transverse field electric machine, and the like. Typically, such electric machines include a stator and a rotor that is movable, for example, rotatable, with respect to the stator. Also, the rotor and/or stator include laminates stacked along an axial direction of the electric machine. Electric machines, such as the radial field electric machines, are currently being used in a variety of applications including, but not limited to, electric pumps such as electric submersible pumps (ESPs). Typically, the electric machine employs permanent magnets in the stator and/or rotor. The ESPs that employ permanent magnet based electric machines (e.g., motor) have been found to be more efficient and powerful in comparison to the ESPs that employ induction motors.

Further, the length of the electric machine in one dimension is often larger than the maximum feasible size of a permanent magnet, more particularly, in case of high aspect ratio ESPs. Moreover, while the diameter of the electric machine for use in such a high aspect ratio ESP is in a range of about 90 mm-250 mm, a length of the electric machine may be in the range of about 3 meters. However, obtaining permanent magnets that match the length of the electric machine is an onerous and expensive task.

Currently, the desired length of the permanent magnet is achieved by stacking a plurality of permanent magnets of smaller lengths. In particular, the permanent magnets are stacked serially, end-to-end along an axis of the electric machine to achieve the desired length of the permanent magnet. Traditionally, adjacently disposed permanent magnets are joined to one another via a butt joint that is perpendicular to an axis of rotation of the rotor. Disadvantageously, such butt joints between the adjacently disposed permanent magnets are not well supported by the laminates of the stator or rotor. The interface between adjacent permanent magnets may fall within a single laminate, which does not provide strong support against lateral movement. Because the permanent magnets arranged in this fashion tend to repel one another and the ends of the permanent magnets deflect laterally in response to the repulsive magnetic effect, the weak support provided to the interface between adjacent magnets may allow the ends of the magnets to damage the laminates and cause mechanical failure of the electric machine. In particular, the repulsion between the adjacent permanent magnets leads to cracks in the laminates of the rotor (or stator) that are disposed in proximity to the butt joint, thereby resulting in reduced lifetime of the electric machine.

SUMMARY OF THE INVENTION

In accordance with aspects of the present specification, an electric machine is presented. The electric machine includes a stator. The electric machine further includes a rotor disposed concentric to the stator such that a center of the rotor is aligned along an axial direction of the electric machine. At least one of the rotor and the stator includes a core including a plurality of laminates stacked along the axial direction of the electric machine, where the stacked plurality of laminates defines a plurality of axial slots. Furthermore, at least one of the rotor and the stator further includes a permanent magnet assembly disposed in one or more of the plurality of axial slots, where the permanent magnet assembly includes two or more permanent magnets disposed serially along the axial direction of the electric machine such that adjacently disposed permanent magnets overlap one another, and where the overlap between the adjacently disposed permanent magnets spans at least two laminates of the plurality of laminates of the core.

In accordance with another aspect of the present specification, a method of manufacturing an electric machine is presented. The method includes forming at least one of a stator and a rotor. The method of forming at least one of the stator and the rotor includes creating one or more cut-outs in each of a plurality of laminates, forming a core by stacking the plurality of laminates in an axial direction of the electric machine such that the one or more cut-outs in each of the plurality of laminates are aligned to form a plurality of axial slots in the core, forming a permanent magnet assembly by arranging serially, along an axial direction of the electric machine, two or more permanent magnets such that adjacently disposed permanent magnets overlap one another to form an overlapped interface, where the overlapped interface between the adjacently disposed permanent magnets spans at least two laminates of the plurality of laminates of the core, positioning the permanent magnet assembly in one or more of the plurality of axial slots. Additionally, the method includes disposing the rotor concentric to the stator such that a center of the rotor is aligned with the axial direction of the electric machine to form the electric machine.

In accordance with yet another aspect of the present specification, an electric submersible pump is presented. The electric submersible pump includes a pump. In addition, the electric submersible pump includes an electric motor operatively coupled to the impeller. The electric machine includes a stator and a rotor disposed concentric to the stator such that a center of the rotor is aligned along an axial direction of the electric machine. Furthermore, at least one of the rotor and the stator includes a core including a plurality of laminates stacked along the axial direction of the electric machine, where the stacked plurality of laminates defines a plurality of axial slots and a permanent magnet assembly disposed in one or more of the plurality of axial slots, where the permanent magnet assembly includes two or more permanent magnets disposed serially along the axial direction of the electric machine such that adjacently disposed permanent magnets overlap one another to form an overlapped interface that spans at least two laminates of the plurality of laminates of the core.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

In the following specification and the representative embodiments, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

In some embodiments, the term "electric machine" as used herein refers to a machine operable using electricity and utilizing permanent magnets to cause mechanical movement of one or more elements of the electric machine in response to application of the electricity. Non-limiting example of such electric machines include an electric motor. In some other embodiments, the term "electric machine" may refer to a machine capable of generating electricity by employing permanent magnets. A non-limiting example of such an electric machine includes a generator. Moreover, electric machines may be classified into topologies such as, but not limited to, radial field electric machines, axial field electric machines, and transverse field electric machines.

Figure 1:
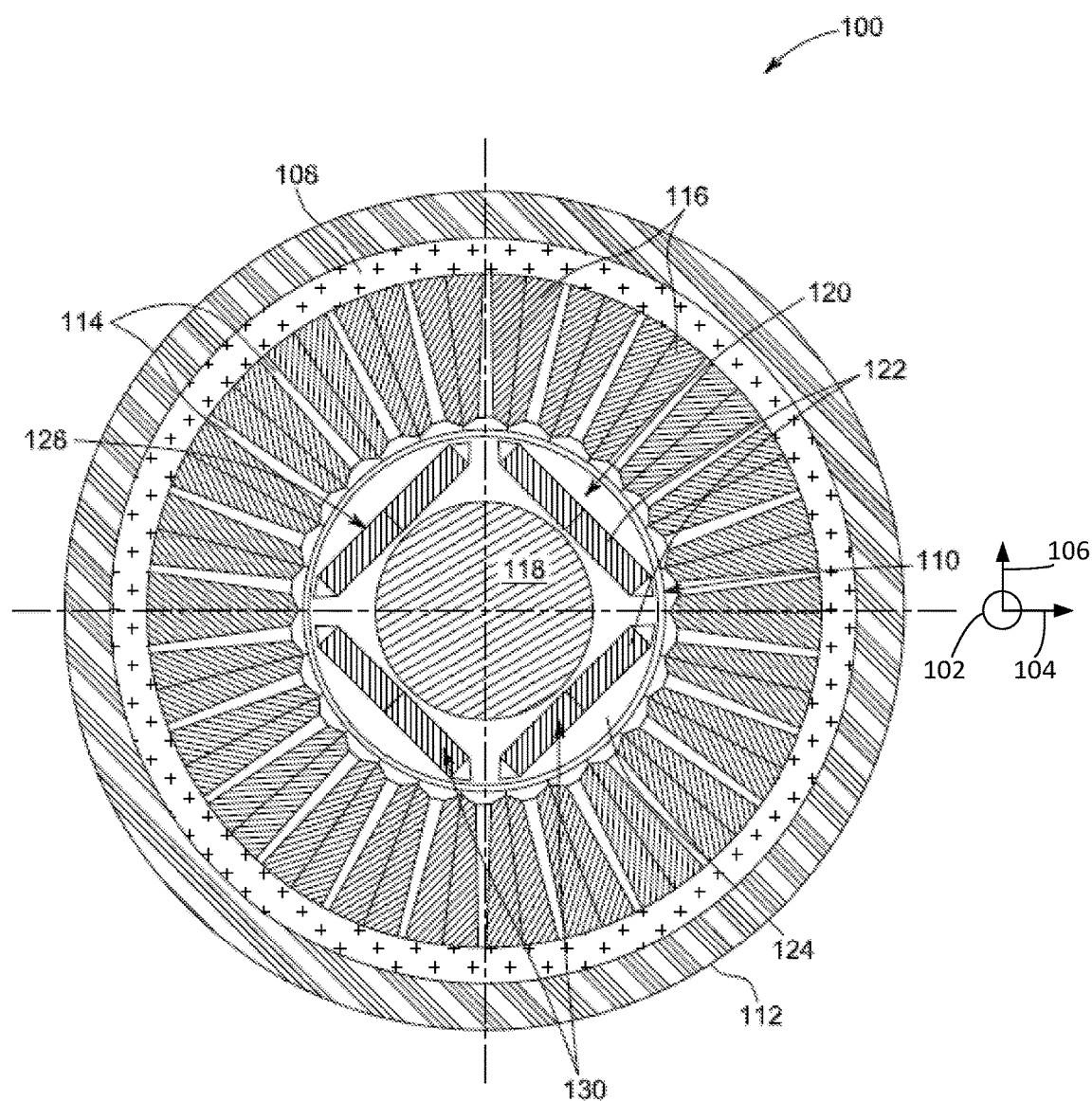
FIG. 1 is a diagrammatic representation of a cross-sectional view of an exemplary electric machine, in accordance with aspects of the present specification.

FIG. 1 is a diagrammatic representation of a cross-sectional view of an exemplary electric machine 100, in accordance with aspects of the present specification. The electric machine 100 is characterized by a cylindrical co-ordinate system comprised of an axial direction 102, a radial direction 104, and a tangential direction 106. The radial direction 104 and tangential direction 106 together define a plane that is orthogonal to the axial direction 102. As used herein, the terms "lateral" and "laterally" refer to movement or forces expressed substantially in a plane that is orthogonal to the axial direction 102. In the example of FIG. 1, the electric machine 100 is a radial field electric machine such as an interior permanent magnet (IPM) motor. The electric machine 100 includes a stator 108 and a rotor 110 disposed in a housing 112. More particularly, the rotor 110 may be disposed concentric to the stator 108 such that a center of the rotor 110 is aligned along the axial direction 102 of the electric machine 100. Moreover, in the embodiment of FIG. 1, the stator 108 is disposed such that the rotor 110 is surrounded by the stator 108. However, in certain other embodiments, the stator 108 and the rotor 110 may be arranged such that the stator 108 is surrounded by the rotor 110.

In some embodiments, the stator 108 may include a plurality of stator poles 114 and a stator winding 116 that surrounds the stator poles 114. The stator winding 116 may be a multi-phase (e.g., three-phase) winding.

The rotor 110 may include a rotor shaft 118, a rotor core 120, and a plurality of permanent magnet assemblies 122. In some embodiments, the rotor core 120 may be mounted on the rotor shaft 118, while in some other embodiments; the rotor core 120 may be an integral part of the rotor shaft 118. The rotor core 120 may include a plurality of laminates that are stacked in the axial direction 102 of the electric machine 100. In the example of FIG. 1, reference numeral 124 is used to represent a front facing laminate. More particularly, in the embodiment of FIG. 1, each laminate 124 of the plurality of laminates may be disposed orthogonal to the axial direction 102, such that the laminate 124 lies substantially in the plane defined by the radial direction 104 and tangential direction 106. In some embodiments, each of the plurality of laminates 124 may include a plurality of cut-outs 128. In the example of FIG. 1, the laminate 124 is shown as including four (4) cut-outs 128. However, the laminate 124 may include fewer or greater number of cut-outs.

The plurality of laminates 124 is stacked along the axial direction 102 of the electric machine 100 such that respective cut-outs 128 of each of the plurality of laminates 124 are aligned to create a plurality of axial slots 130. In some embodiments the plurality of laminates 124 is stacked along the axial direction with an angular displacement between laminates such that the respective cut-outs 128 form a plurality of axial slots 130 which is skewed. Moreover, each permanent magnet assembly 122 may include one or more permanent magnets disposed in each axial slot 130. More particularly, in the electric machine 100 of FIG. 1, a plurality of permanent magnet assemblies 122 is disposed within the rotor core 120 such that the permanent magnet assemblies 122 are shielded from exposure to the stator 108.

In some embodiments, the permanent magnet assemblies 122 are arranged such that an overlap between adjacent permanent magnets in each of the permanent magnet assemblies 122 is supported by at least two laminates of the plurality of laminates 124. Advantageously, a lateral force arising from any mechanical movement of the permanent magnets about the overlap is opposed by at least two supporting laminates 124, thereby resulting in improved mechanical strength of the electric machine 100. The permanent magnet assembly 122 will be described in greater detail with reference to FIGS. 4-10.

Figure 2:
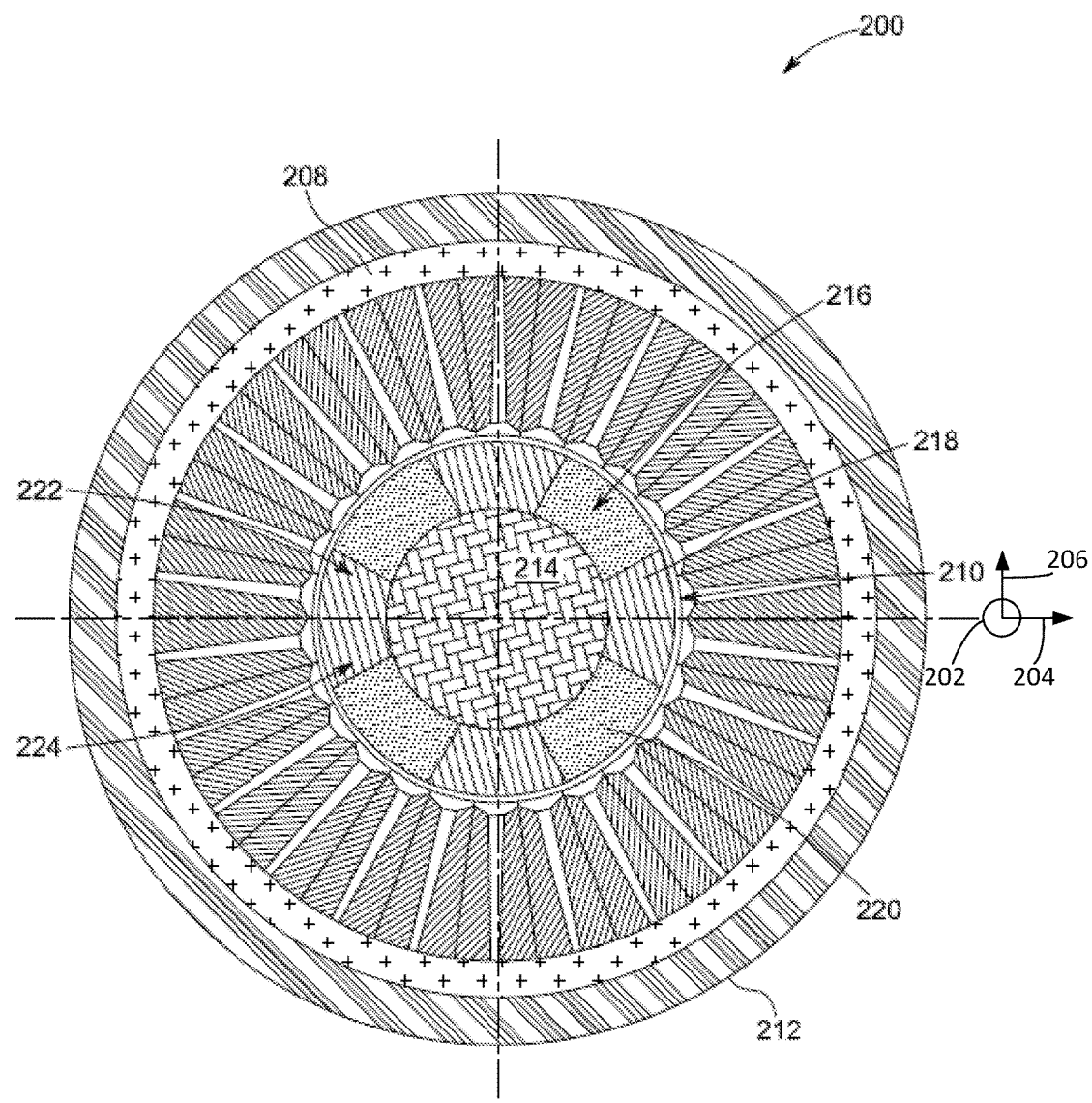
FIG. 2 is a diagrammatic representation of a cross-sectional view of another exemplary electric machine, in accordance with aspects of the present specification.

Referring now to FIG. 2, a diagrammatic representation of a cross-sectional view of another exemplary electric machine 200, in accordance with aspects of the present specification, is presented. The electric machine 200 is characterized by a cylindrical co-ordinate system comprised of an axial direction 202, a radial direction 204, and a tangential direction 206. In the example of FIG. 2, the electric machine 200 of FIG. 2 is a radial field electric machine such as an exterior permanent magnet (EPM) motor. The electric machine 200 includes a stator 208 and a rotor 210 disposed in a housing 212. More particularly, the rotor 210 may be disposed concentric to the stator 208 such that a center of the rotor 210 is aligned along the axial direction 202 of the electric machine 200. Moreover, in the embodiment of FIG. 2, the stator 208 is disposed such that the rotor 210 is surrounded by the stator 208. However, in certain other embodiments, the stator 208 and the rotor 210 may be arranged such that the stator 208 is surrounded by the rotor 210.

Furthermore, it may also be noted that the configuration of the stator 208 is substantially similar to the stator 108 of FIG. 1. In the embodiment of FIG. 2, the rotor 210 includes a rotor shaft 214, a rotor core 216, and a plurality of permanent magnet assemblies 218. Also, in the example of FIG. 2, the plurality of permanent magnet assemblies 218 is exposed to the stator 208. The rotor core 216 may include a plurality of laminates 220 that are stacked along the axial direction 202 of the electric machine 200. More particularly, the plurality of laminates 220 may be disposed orthogonal to the axial direction 202, such that each of the plurality of laminates 220 lies substantially in a plane defined by the radial direction 204 and tangential direction 206. It may be noted that for ease of illustration, a single laminate 220 is depicted in FIG. 2.

In some embodiments, each of the plurality of laminates 220 may include a plurality of cut-outs 222. The example of FIG. 2 depicts the laminate 220 as including four (4) cut-outs 222. However, use of a fewer or greater number of cut-outs 222 is envisaged. In accordance with exemplary aspects of the present specification, in the example of FIG. 2, the cut-outs 222 are formed along the outer periphery of the rotor core 216. Moreover, the plurality of laminates 220 is stacked along the axial direction 202 of the electric machine 200 such that respective cut-outs 222 of each of the plurality of laminates 220 are aligned to create a plurality of axial slots 224. A permanent magnet assembly 218 having one or more permanent magnets may be disposed in each axial slot 224 of the plurality of axial slots 224 such that at least one surface of the permanent magnet assembly 218 is exposed to the stator 208. In accordance with aspects of the present specification, in certain embodiments, the plurality of permanent magnet assemblies 218 may be arranged such that there is an overlap between adjacent permanent magnets. More specifically, the permanent magnet assemblies 218 may be positioned such that the overlap between the adjacent permanent magnets in each of the permanent magnet assemblies 218 is supported by at least two laminates 220. This arrangement provides the electric machine 200 having improved mechanical strength since a lateral force arising from any lateral movement of the permanent magnets at the interface between adjacent permanent magnets within the permanent magnet assemblies 218 is opposed by a plurality of supporting laminates 220. The permanent magnet assembly 218 will be described in greater detail with reference to FIGS. 4-10.

In the exemplary embodiments depicted in FIGS. 1 and 2, the permanent magnet assemblies 122, 218 are depicted as being disposed within respective rotors 110, 210. In accordance with further aspects of the present specification, in certain other embodiments, the permanent magnet assemblies may be disposed within a stator of an electric machine.

Figure 3:
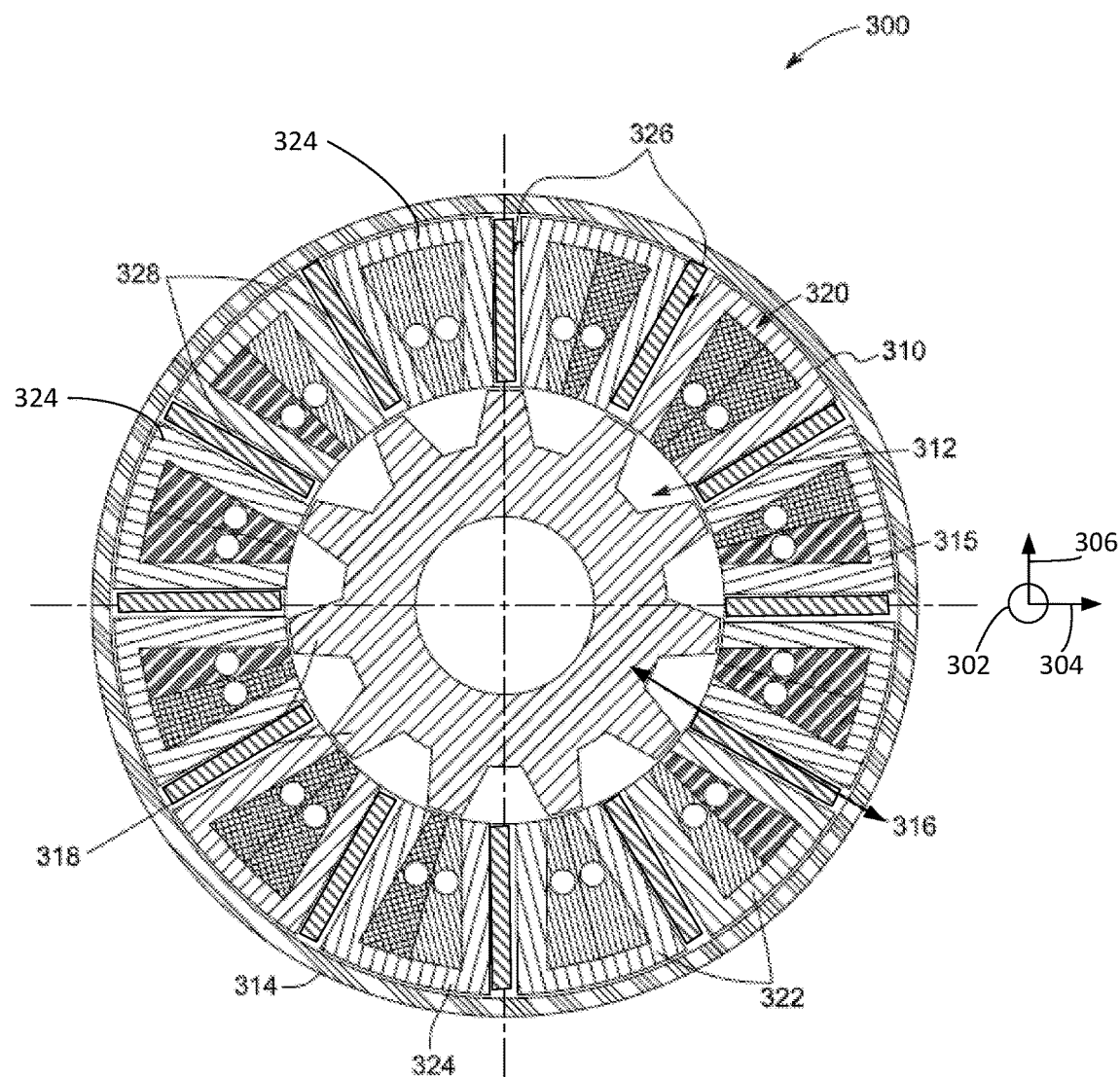
FIG. 3 is a diagrammatic representation of a cross-sectional view of yet another exemplary electric machine, in accordance with aspects of the present specification.

FIG. 3 is a diagrammatic representation of a cross-sectional view of an electric machine 300 where permanent magnet assemblies are disposed within a stator, in accordance with aspects of the present specification. The electric machine 300 is characterized by a cylindrical co-ordinate system comprised of an axial direction 302, a radial direction 304, and a tangential direction 306. In the example of FIG. 3, the electric machine 300 is a radial field electric machine such as a flux switching machine (FSM) or switched reluctance machine (SRM). The electric machine 300 includes a stator 310 and a rotor 312 disposed in a housing 314. More particularly, the rotor 312 may be disposed concentric to the stator 310 such that a center of the rotor 312 is aligned along an axial direction 302 of the electric machine 300. Moreover, in the embodiment of FIG. 3, the stator 310 is disposed such that the rotor 312 is surrounded by the stator 310. However, in certain other embodiments, the stator 310 and the rotor 312 may be arranged such that the stator 310 is surrounded by the rotor 312.

The rotor 312 may include a rotor core 316 and a plurality of rotor poles 318. These rotor poles 318 may be disposed and/or created along an outer periphery of the rotor core 316. The stator 310 may include a stator core 320 formed by sets of laminates 322. Each set of laminates 322 in turn includes a plurality of π-shaped laminates 324. For ease of illustration, a single front facing, π-shaped laminate 324 corresponding to each set of laminates 322 is depicted in FIG. 3. In some embodiments, the sets of laminates 322 may be arranged to achieve a cylindrical shape such that axial slots 326 are created between adjacently disposed sets of plurality of laminates 322. In some embodiments, a permanent magnet assembly 328 may be disposed in one or more of the axial slots 326.

Additionally, in certain embodiments, the plurality of permanent magnet assemblies 328 are disposed such that an overlap between adjacent permanent magnets in each of the permanent magnet assemblies 328 is supported by at least two laminates of the plurality of laminates 324. This exemplary arrangement advantageously results in the electric machine 300 having improved mechanical strength since a force arising from any lateral movement of the permanent magnets about the overlap is opposed by at least two supporting laminates. The permanent magnet assembly 328 will be described in greater detail with reference to FIGS. 4-10.

It may be noted that although three configurations of an electric machine are presented in FIGS. 1-3, it may be noted that embodiments of the present specification may also find application in other undisclosed configurations of electric machines including but not limited to various configurations of radial field electric machines, axial field electric machines, or transverse field electric machines, where a permanent magnet assembly includes more than one permanent magnet to achieve a desired length of the permanent magnet assembly.

Figure 4A:
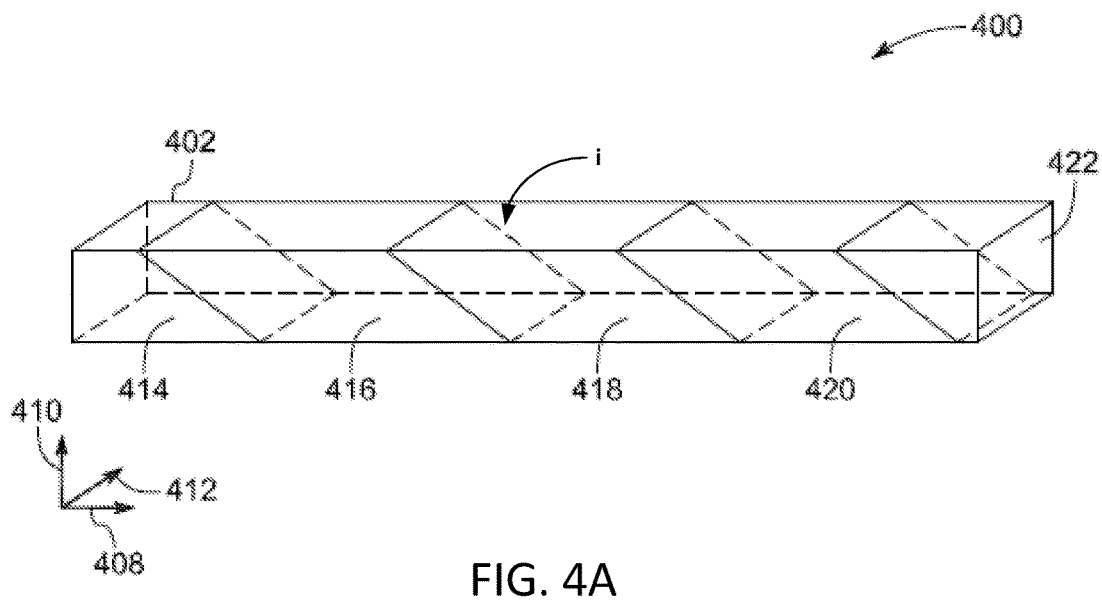
FIG. 4A is a three-dimensional diagrammatic representation of one embodiment of a permanent magnet assembly for use in an electric machine, in accordance with aspects of the present specification.
Figure 4B:
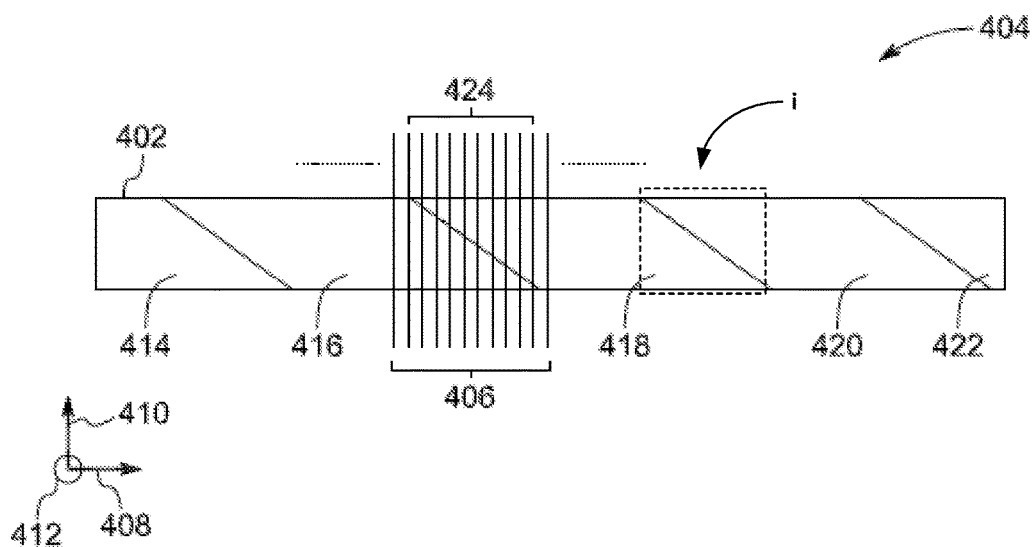
FIG. 4B is a two-dimensional diagrammatic representation of the permanent magnet assembly of FIG. 4A, in accordance with aspects of the present specification.

Turning now to FIG. 4A, a three-dimensional (3D) diagrammatic representation 400 of one embodiment of a permanent magnet assembly 402 is presented. The permanent magnet assembly 402 may be configured for use in the electric machines 100, 200, or 300 (see FIGS. 1-3). FIG. 4B is a two-dimensional (2D) diagrammatic representation 404 of the permanent magnet assembly 402 of FIG. 4A. In addition, FIG. 4B depicts a plurality of laminates 406.

In FIGS. 4A and 4B, the permanent magnet assembly 402 is characterized by an first direction 408, a second direction 410, and a third direction 412. The first direction 408 is an axial direction, the second direction 410 approximates a radial direction, and the third direction 412 is a substantially azimuthal or tangential direction. Although first, second and third directions 408, 410, 412 are similar to the corresponding directions depicted in FIGS. 1-3, it will be appreciated that in expressing the solid geometries of the permanent magnet assembly 402, it may be acceptable in certain cases to rely on a standard Cartesian coordinate system. Further, the permanent magnet assembly 402 may be representative of one embodiment of the permanent magnet assemblies 122, 218, 328 respectively of FIGS. 1, 2, and 3.

In a presently contemplated configuration, the permanent magnet assembly 402 may include two or more permanent magnets 414, 416, 418, 420, and 422 (hereinafter referred to as permanent magnets 414-422). In the examples of FIGS. 4A and 4B, for ease of illustration the permanent magnet assembly 402 is depicted as having five permanent magnets 414-422. However, fewer or greater number of permanent magnets may be used to form the permanent magnet assembly 402 based on a desired required length of the permanent magnet assembly 402. Also, in accordance with aspects of the present specification, permanent magnets of similar or different dimensions may be employed to form the permanent magnet assembly 402. For example, the permanent magnets of similar or different lengths may be employed to form the permanent magnet assembly 402. As illustrated in FIGS. 4A and 64, each of the permanent magnets 414-420 can be characterized as a parallelepiped in which two opposing faces are parallelograms with no right angle.

In some embodiments, as depicted in FIGS. 4A and 4B, the permanent magnets 414-422 are arranged serially along the axial direction 408 of the electric machine such that adjacently disposed permanent magnets 414-422 overlap one another. More particularly, the adjacently disposed permanent magnets 414-422 overlap one another such that the overlap spans (i.e., spreads across) at least two laminates 424 (hereinafter referred to as encompassed laminates 424) of the laminates 406 of a core. Some examples of the core include the rotor cores 120, 216 and the stator core 320. As previously noted, the laminates 406 of the core are disposed orthogonal to the axial direction 408. By way of example, in the embodiment of FIG. 4B, the overlap between the permanent magnets 416 and 418 spans ten laminates (i.e., ten encompassed laminates 424).

Traditionally, the overlap between the adjacently disposed permanent magnets is defined by a butt joint which is perpendicular to the axial direction. In such a traditional butt joint, the overlap between the adjacently disposed permanent magnets generally spans only one laminate. Advantageously, arranging the permanent magnets as described with reference to FIGS. 4A-4B provides an overlapped interface (i) that axially extends across at least two laminates 406. The overlapped interface (i) aids in distributing any lateral movement at the overlapped interface (i) between the adjacently disposed permanent magnets amongst the encompassed laminates 424 of the core.

Figure 5A:
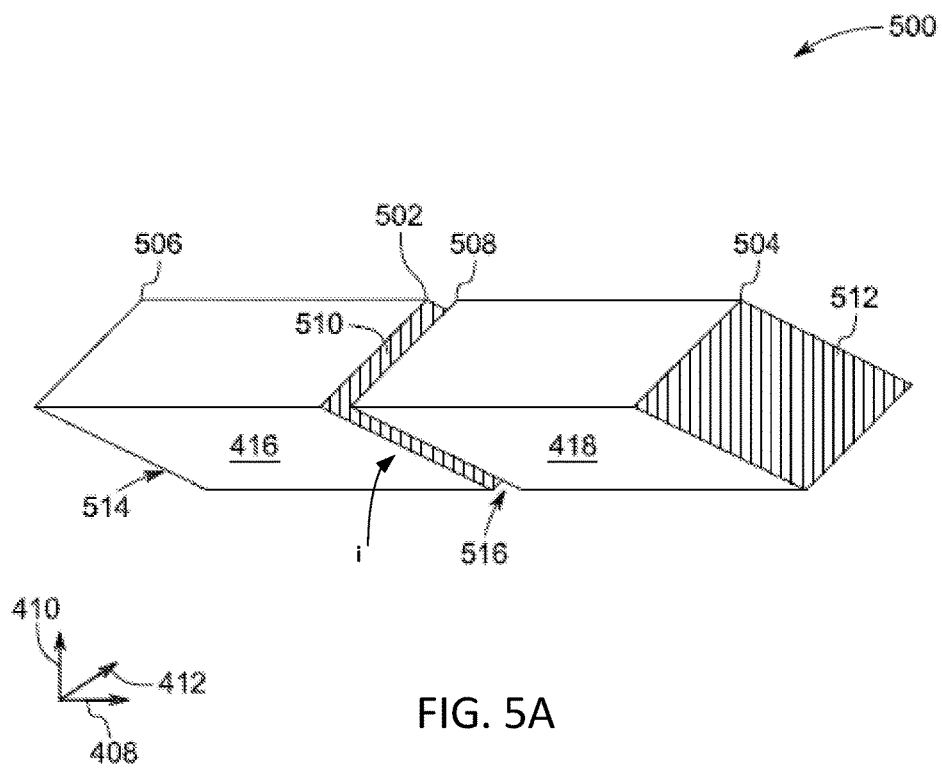
FIG. 5A is a diagrammatic representation of a portion of the permanent magnet assembly of FIG. 4A, in accordance with aspects of the present specification.
Figure 5B:
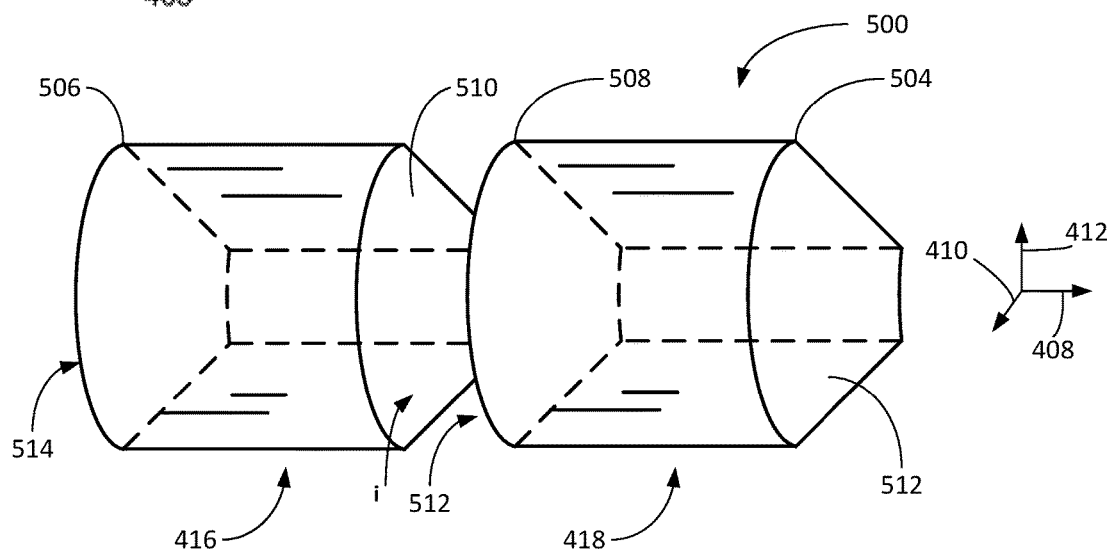
FIG. 5B is a diagrammatic representation of an embodiment of the permanent magnet assembly of FIG. 4A, in which the permanent magnets have a partial toroidal form.

FIG. 5A depicts a detailed diagrammatic representation 500 of a portion of the permanent magnet assembly 402 of FIG. 4B. In particular, the diagrammatic representation 500 depicts the permanent magnets 416 and 418 in greater detail. The permanent magnets 416, 418 in FIG. 5A follow a prismatic form that can be produced by linearly extruding the polygonal face in along the third direction 412. In contrast, FIG. 5B presents an alternate form of the permanent magnets 416, 418 in which the same polygonal face has been extruded along an arcuate path in the third direction 412, which represents a partial revolution about the first direction 408.

As previously noted, the permanent magnets 416 and 418 are disposed serially, end-to-end along the axial direction 408. Each permanent magnet 416, 418 of the permanent magnet assembly 402 may include a respective first end and a second end along the axial direction 408 of the electric machine. In the example of FIG. 5, reference numerals 502 and 504 respectively represent the first ends of the permanent magnets 416, 418, while reference numerals 506 and 508 respectively represent the second ends of the permanent magnets 416, 418.

Moreover, each first end 502, 504 includes a first mating surface and each second end 506, 508 includes a second mating surface. It may be noted that surfaces of the permanent magnets 416 and 418 at the respective first ends 502, 504 may be referred to as first mating surfaces 510 and 512. Additionally, surfaces of the permanent magnets 416 and 418 at the respective second ends 506, 508 may be referred to as second mating surfaces 514 and 516.

In accordance with aspects of the present specification, at least one of the first mating surface and the second mating surface of each permanent magnet is oriented at a non-zero angle with respect to the axial direction and radial direction of the electric machine. By way of example, in the embodiment of FIG. 5, at least one of the first mating surface 512 and the second mating surface 516 of the permanent magnet 418 is oriented at a non-zero angle with respect to the axial direction 408 and radial direction 410 of the electric machine. Moreover, in the embodiment of FIG. 5, at least one of the first mating surface 512 and the second mating surface 516 is a uniform surface. In other embodiments, at least one of the first mating surface 512 and the second mating surface 516 is a chamfer formed along a plane defined by the axial direction 408 and the radial direction 410 of the electric machine. In yet another embodiment, at least one of the first mating surface 512 and the second mating surface 516 is a contoured surface, such as an S-curved contour. It may be noted that for ease of explanation, different embodiments of the mating surfaces have been described with reference to the permanent magnet 418. However, the first and second mating surfaces of other permanent magnets in the permanent magnet assembly 402 may also have similar configurations.

As depicted in FIG. 5, the permanent magnets 416, 418 are disposed serially in the axial direction 408 such that the first mating surface of one permanent magnet overlaps with the second mating surface of an adjacent permanent magnet to create an overlapped interface (i). By way of example, the permanent magnets 416, 418 are disposed serially along the axial direction 408 such that the first mating surface 510 of the permanent magnet 416 overlaps with the second mating surface 516 of the adjacent permanent magnet 418. Also, as previously noted, the overlap between the adjacently disposed permanent magnets 416, 418 spans at least two laminates.

It will be appreciated that although a space is shown between the permanent magnets 416, 418 in FIG. 5 to better illustrate the first mating surface 510 and second mating surface 516, that the first and second mating surfaces 510, 516 would be placed in contact when installed, for example, within the rotor cores 120, 216 or stator core 320. Importantly, the permanent magnets 416, 418 can be magnetized and cut such that an attractive magnetic force is produced at the overlapped interface (i) that exceeds any repulsive force. For example, polarizing the permanent magnets 416, 418 such that the magnetic field extends substantially in the radial direction 410 would tend to produce an attractive force between the permanent magnets 416, 418 at the overlapped interface (i) that would further reduce the presentation of lateral forces in the plane extending orthogonally to the axial direction 408. Alternatively, if the polarization of the permanent magnets 416, 418 follows the tangential direction 412, the permanent magnets 416, 418 may not exhibit a net attractive force at the overlapped interface (i). In each of these embodiments, the plurality of laminates 406 in proximity to the overlapped interface (i) would oppose lateral forces produced at the junction between the permanent magnets 416, 418.

Figure 6A:
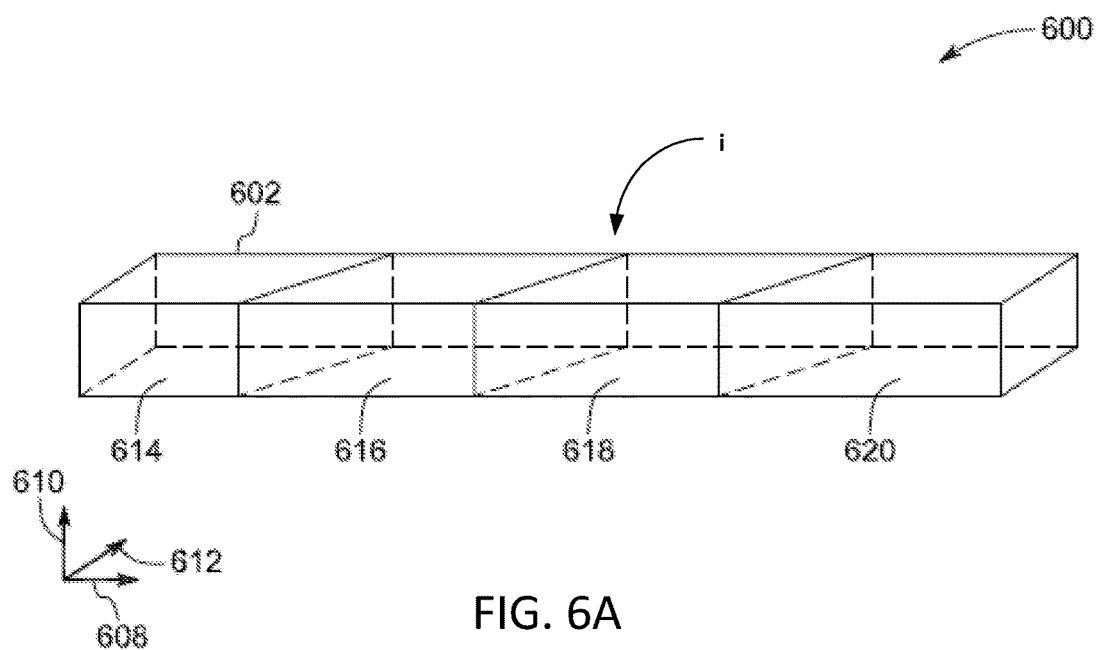
FIG. 6A is a three-dimensional diagrammatic representation of another embodiment of a permanent magnet assembly for use in an electric machine, in accordance with aspects of the present specification.
Figure 6B:
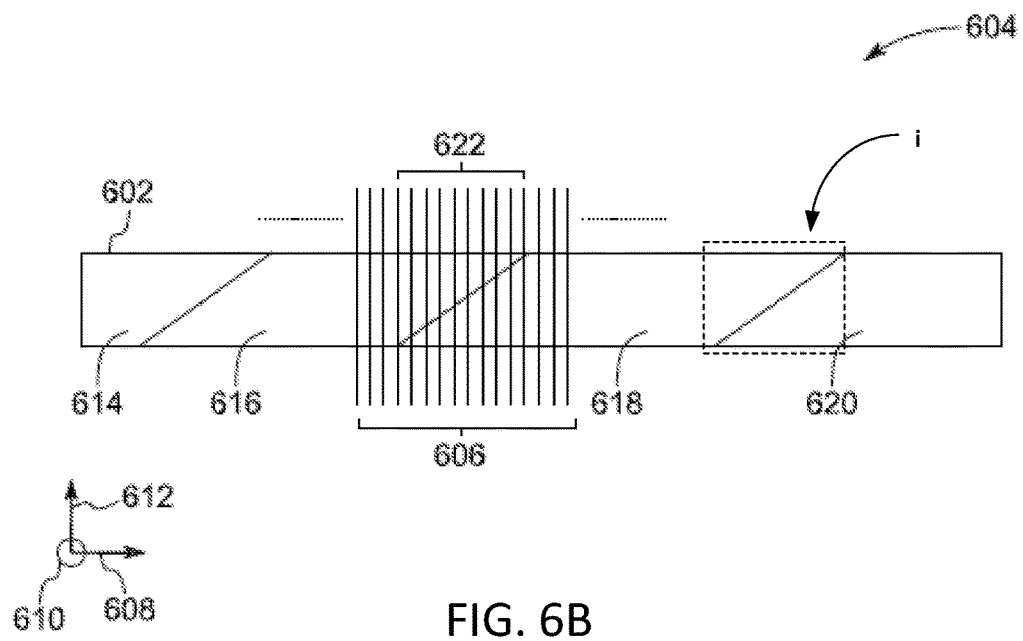
FIG. 6B is a two-dimensional diagrammatic representation of the permanent magnet assembly of FIG. 6A, in accordance with aspects of the present specification.

Turning now to FIG. 6A, a 3D diagrammatic representation 600 of another embodiment of a permanent magnet assembly 602 is presented. The permanent magnet assembly 602 may be configured for use in the electric machines 100, 200, or 300 (see FIGS. 1-3). FIG. 6B is a 2D diagrammatic representation 604 of the permanent magnet assembly 602 of FIG. 6A.

In FIGS. 6A and 6B, the permanent magnet assembly 602 is characterized by a first direction 608, a second direction 610, and a third direction 612. The first direction 408 is an axial direction, the second direction 410 approximates a radial direction, and the third direction 412 is a substantially azimuthal or tangential direction. Although first, second and third directions 608, 610, 612 are similar to the corresponding directions depicted in FIGS. 1-3, it will be appreciated that in expressing the solid geometries of the permanent magnet assembly 602, it may be acceptable in certain cases to rely on a standard Cartesian coordinate system. Further, the permanent magnet assembly 602 is representative of another embodiment of the permanent magnet assemblies 122, 218, 328 of FIGS. 1, 2, and 3.

In a presently contemplated configuration, the permanent magnet assembly 602 includes two or more permanent magnets 614, 616, 618, and 620 (hereinafter referred to as permanent magnets 614-620). In the examples of FIGS. 6A and 6B, for ease of illustration the permanent magnet assembly 602 is depicted as having four permanent magnets 614-620. However, fewer or greater number of permanent magnets may be used to form the permanent magnet assembly 602 based on a desired required length of the permanent magnet assembly 602. Also, in accordance with aspects of the present specification, permanent magnets of similar or different lengths may be employed to form the permanent magnet assembly 602. As illustrated in FIGS. 6A and 6B, each of the permanent magnets 614-620 can be characterized as a parallelepiped in which two opposing faces are parallelograms with no right angle.

In some embodiments, as depicted in FIGS. 6A and 6B, the permanent magnets 614-620 are disposed serially, end-to-end along the axial direction 608 of the electric machine such that adjacently disposed permanent magnets 614-620 overlap one another at an overlapped interface (i). More particularly, the adjacently disposed permanent magnets 614-620 overlap one another such that the overlapped interface (i) spans (i.e., spreads across) at least two laminates 622 (hereinafter referred to as encompassed laminates 622) of the laminates 606 of a core. By way of example, in the embodiment of FIG. 6B, the overlapped interface (i) between the permanent magnets 616 and 618 spans ten laminates (i.e., ten encompassed laminates 622). Some examples of the core include the rotor cores 120, 216 and the stator core 320. As previously noted, the laminates 606 of the core are disposed orthogonal to the axial direction 608. Advantageously, arranging the permanent magnets as described with reference to FIGS. 6A-6B provides an overlapped interface (i) that spans at least two laminates of the laminates 606. This overlap aids in limiting any lateral mechanical movement at the overlap between the adjacently disposed permanent magnets amongst the encompassed laminates 622 of the core.

Figure 7:
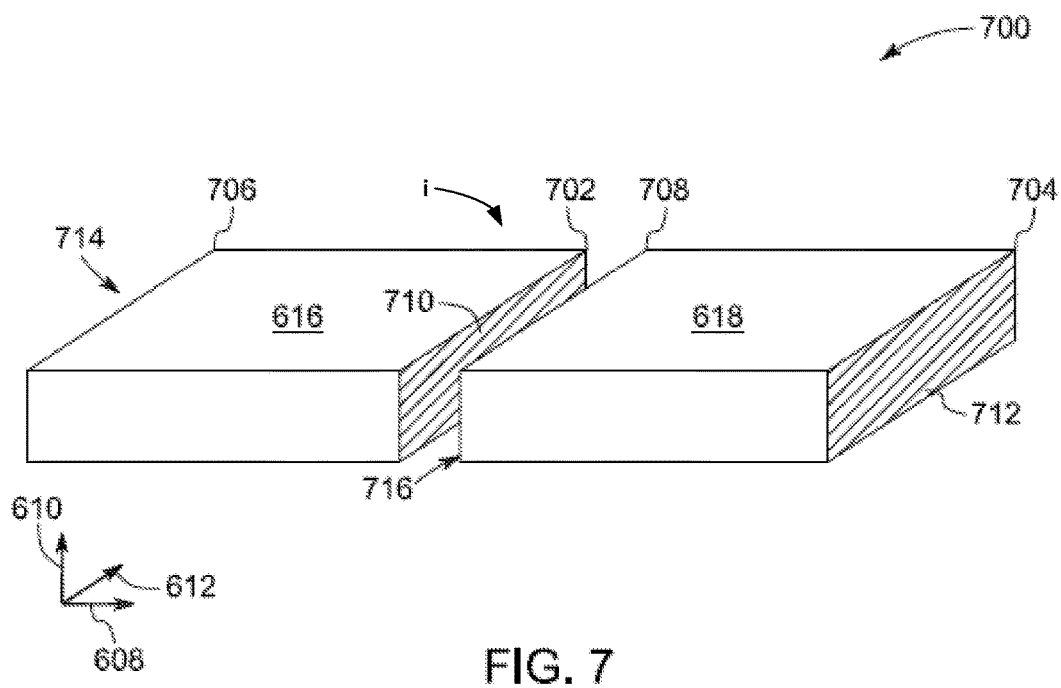
FIG. 7 is a diagrammatic representation of a portion of the permanent magnet assembly of FIG. 6A, in accordance with aspects of the present specification.

FIG. 7 depicts a detailed a diagrammatic representation 700 of a portion of the permanent magnet assembly 602 of FIG. 6B. In particular, the diagrammatic representation 700 depicts the permanent magnets 616 and 618 in greater detail.

As previously noted, the permanent magnets 616 and 618 are disposed serially, end-to-end along the axial direction 608. Each permanent magnet 616, 618 of the permanent magnet assembly 602 may include a respective first end and a second end along the axial direction 608 of the electric machine. In the example of FIG. 7, reference numerals 702 and 704 respectively represent the first ends of the permanent magnets 616, 618, while reference numerals 706 and 708 respectively represent the second ends of the permanent magnets 616, 618.

Additionally, each first end 702, 704 includes a first mating surface and each second end 706, 708 includes a second mating surface. It may be noted that surfaces of the permanent magnets 616 and 618 at the respective first ends 702, 704 may be referred to as first mating surfaces 710 and 712. Additionally, surfaces of the permanent magnets 616 and 618 at the respective second ends 706, 708 may be referred to as second mating surfaces 714 and 716.

In accordance with aspects of the present specification, at least one of the first mating surface and the second mating surface of each permanent magnet is oriented at a non-zero angle with respect to the axial direction and the tangential direction of the electric machine. By way of example, in the embodiment of FIG. 7, at least one of the first mating surface 712 and the second mating surface 716 of the permanent magnet 618 is oriented at a non-zero angle with respect to the axial direction 608 and tangential direction 612 of the electric machine. Moreover, in the embodiment of FIG. 7, at least one of the first mating surface 712 and the second mating surface 716 is a uniform surface. In other embodiments, at least one of the first mating surface 712 and the second mating surface 716 is a chamfer formed along a plane defined by the axial direction 608 and the tangential direction 612 of the electric machine. In yet another embodiment, at least one of the first mating surface 712 and the second mating surface 716 is a contoured surface, such as an S-curved contour. It may be noted that for ease of explanation, different embodiments of the mating surfaces have been described with reference to the permanent magnet 618. However, the first and second mating surfaces of other permanent magnets in the permanent magnet assembly 602 may also have similar configurations.

As depicted in FIG. 7, the permanent magnets 616, 618 may be disposed serially in the axial direction 608 such that the first mating surface of one permanent magnet overlaps with the second mating surface of an adjacent permanent magnet at an overlapped interface (i). By way of example, the permanent magnets 616, 618 are disposed serially along the axial direction 608 such that the first mating surface 710 of the permanent magnet 616 overlaps with the second mating surface 716 of the adjacent permanent magnet 618. Also, as previously noted, the overlap between the adjacently disposed permanent magnets 616, 618 spans at least two laminates.

It will be appreciated that although a space is shown between the permanent magnets 616, 618 in FIG. 7 to better illustrate the first mating surface 710 and second mating surface 716, that the first and second mating surfaces 710, 716 would be placed in contact when installed, for example, within the rotor cores 120, 216 or stator core 320. Importantly, the permanent magnets 616, 618 can be magnetized and cut such that an attractive magnetic force is produced at the overlapped interface (i) that exceeds any repulsive force. For example, polarizing the permanent magnets 616, 618 such that the magnetic field extends substantially in the tangential direction 612 would tend to produce an attractive force between the permanent magnets 616, 618 at the overlapped interface (i) that would further reduce the presentation of lateral forces in the plane extending orthogonally to the axial direction 608. Alternatively, if the polarization of the permanent magnets 616, 618 follows the radial direction 610, the permanent magnets 616, 618 may not exhibit a net attractive force at the overlapped interface (i). In each of these embodiments, the plurality of laminates 606 in proximity to the overlapped interface (i) would oppose lateral forces produced at the junction between the permanent magnets 616, 618.

In the configurations of FIGS. 4-7, the respective mating surfaces of the permanent magnets are oriented at non-zero angles with respect to two directions. For example, in the embodiment of FIGS. 4 and 5, the mating surfaces of the permanent magnets are oriented at a non-zero angle with respect to the radial direction and the axial direction of the electric machine. Further, in the embodiment of FIGS. 6 and 7, the mating surfaces of the permanent magnets are oriented at non-zero angles with respect to the tangential direction and the axial direction of the electric machine. In some embodiments, the permanent magnets of a given permanent magnet assembly may be oriented at non-zero angles with respect to the axial direction, radial direction, and tangential direction (see FIGS. 8-10).

Figure 8:
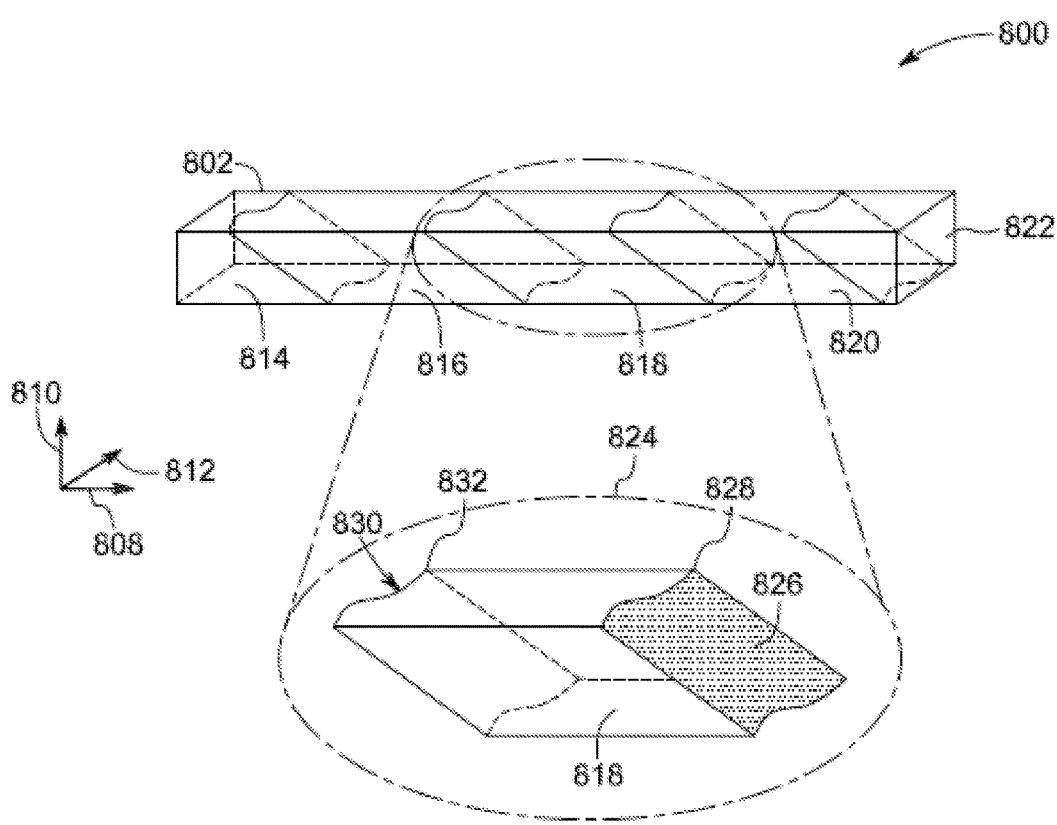
FIG. 8 is a three-dimensional diagrammatic representation of another embodiment of a permanent magnet assembly for use in an electric machine, in accordance with aspects of the present specification.

Turning now to FIG. 8, a 3D diagrammatic representation 800 of another embodiment of a permanent magnet assembly 802 is presented, in accordance with aspects of the present specification. The permanent magnet assembly 802 may be configured for use in the electric machines 100, 200, or 300 (see FIGS. 1-3). The permanent magnet assembly 802 is characterized by an axial direction 808, a radial direction 810, and a tangential direction 812. The axial, radial, and tangential directions 808, 810, 812 are similar to the corresponding directions depicted in FIGS. 1-3. Further, the permanent magnet assembly 802 may be representative of one embodiment of the permanent magnet assemblies 122, 218, 328 respectively of FIGS. 1, 2, and 3.

In a presently contemplated configuration, the permanent magnet assembly 802 may include two or more permanent magnets 814, 816, 818, 820, and 822 (hereinafter referred to as permanent magnets 814-822). The permanent magnets 814-822 are arranged serially along the axial direction 808 of the electric machine such that adjacently disposed permanent magnets 814-822 overlap one another at an overlapped interface (i). More particularly, the adjacently disposed permanent magnets 814-822 overlap one another such that the overlapped interface (i) spans (i.e., spreads across) at least two laminates (see FIGS. 4B and 6B).

For ease of illustration, one permanent magnet 818 of the permanent magnet assembly 802 is shown in an enlarged view 824. In the enlarged view 824, the permanent magnet 818 is shown as having two mating surfaces—a first mating surface 826 at a first end 828 and a second mating surface 830 at a second end 832. In the embodiment of FIG. 8, the first mating surface 826 and the second mating surface 830 are oriented at non-zero angles with respect to the axial, radial, and tangential directions 808, 810, 812. Although the first mating surface 826 and the second mating surface 830 are shown as curved surfaces oriented at an angle to the axial, radial, and tangential directions 808, 810, 812, in some embodiments, the first mating surface 826 and/or the second mating surface 830 may also be flat surfaces oriented at an angle to the axial, radial, and tangential directions 808, 810, 812.

Figure 9:
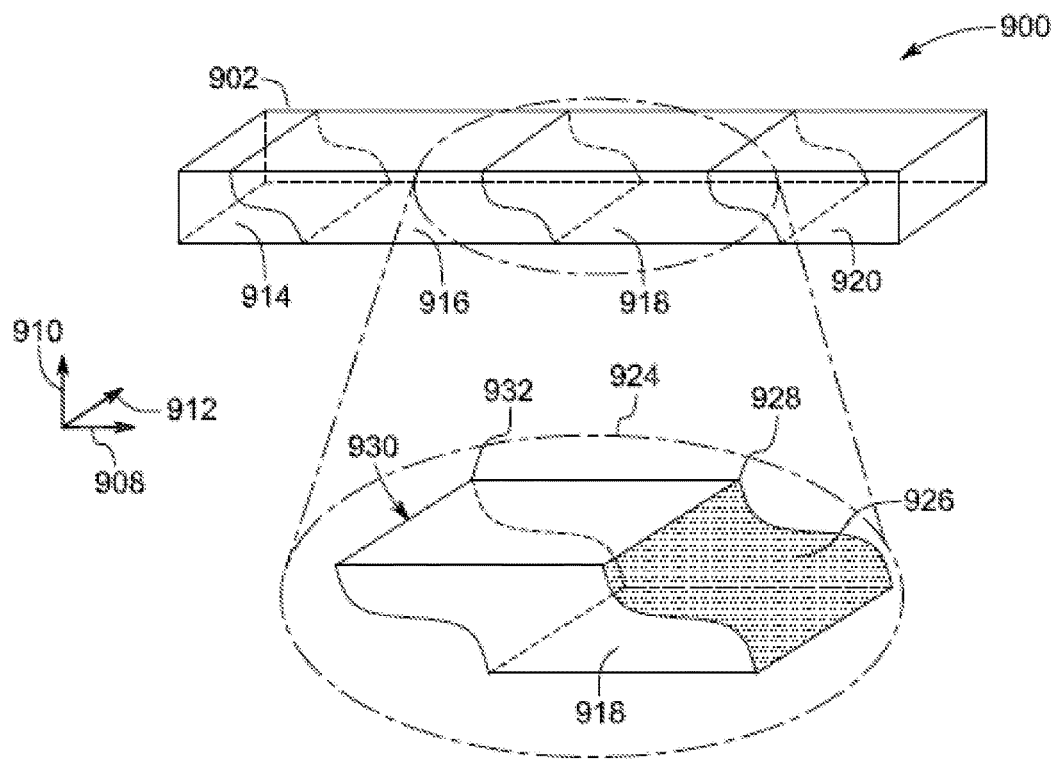
FIG. 9 is a three-dimensional diagrammatic representation of yet another embodiment of a permanent magnet assembly for use in an electric machine, in accordance with aspects of the present specification.

FIG. 9 is a 3D diagrammatic representation 900 of yet another embodiment of a permanent magnet assembly 902 for use in an electric machine, in accordance with aspects of the present specification. The permanent magnet assembly 902 may be configured for use in the electric machines 100, 200, or 300 (see FIGS. 1-3). The permanent magnet assembly 902 is characterized by an axial direction 908, a radial direction 910, and a tangential direction 912. The axial, radial, and tangential directions 908, 910, 912 are similar to the corresponding directions depicted in FIGS. 1-3. Further, the permanent magnet assembly 902 may be representative of one embodiment of the permanent magnet assemblies 122, 218, 328 respectively of FIGS. 1, 2, and 3.

In a presently contemplated configuration, the permanent magnet assembly 902 may include two or more permanent magnets 914, 916, 918, and 920 (hereinafter referred to as permanent magnets 914-920). The permanent magnets 914-920 are arranged serially along the axial direction 908 of the electric machine such that adjacently disposed permanent magnets 914-920 overlap one another at an overlapped interface (i). More particularly, the adjacently disposed permanent magnets 914-920 overlap one another such that the overlapped interface (i) spans (i.e., spreads across) at least two laminates (see FIGS. 4B and 6B).

For ease of illustration, one permanent magnet 918 of the permanent magnet assembly 902 is shown in an enlarged view 924. In the enlarged view 924, the permanent magnet 918 is shown as having two mating surfaces—a first mating surface 926 at a first end 928 and a second mating surface 930 at a second end 932. In the embodiment of FIG. 9, the first mating surface 926 and the second mating surface 930 are oriented at non-zero angles with respect to the axial, radial, and tangential directions 908, 910, 912. Although the first mating surface 926 and the second mating surface 930 are shown as curved surfaces oriented at an angle to the axial, radial, and tangential directions 908, 910, 912, the first mating surface 926 and the second mating surface 930 may also be flat surfaces oriented at an angle to the axial, radial, and tangential directions 908, 910, 912, in some other embodiments.

In the configurations of FIG. 4-9, both the first and second mating surfaces of a given permanent magnet have similar profiles. For example, both the first and second mating surfaces of the permanent magnets in the permanent magnet assembly are shown as being oriented in a similar fashion. However, in accordance with further aspects of the present specification, other configurations of the permanent magnet assembly having differently oriented first and second mating surfaces are also envisioned (see FIG. 10).

Figure 10:
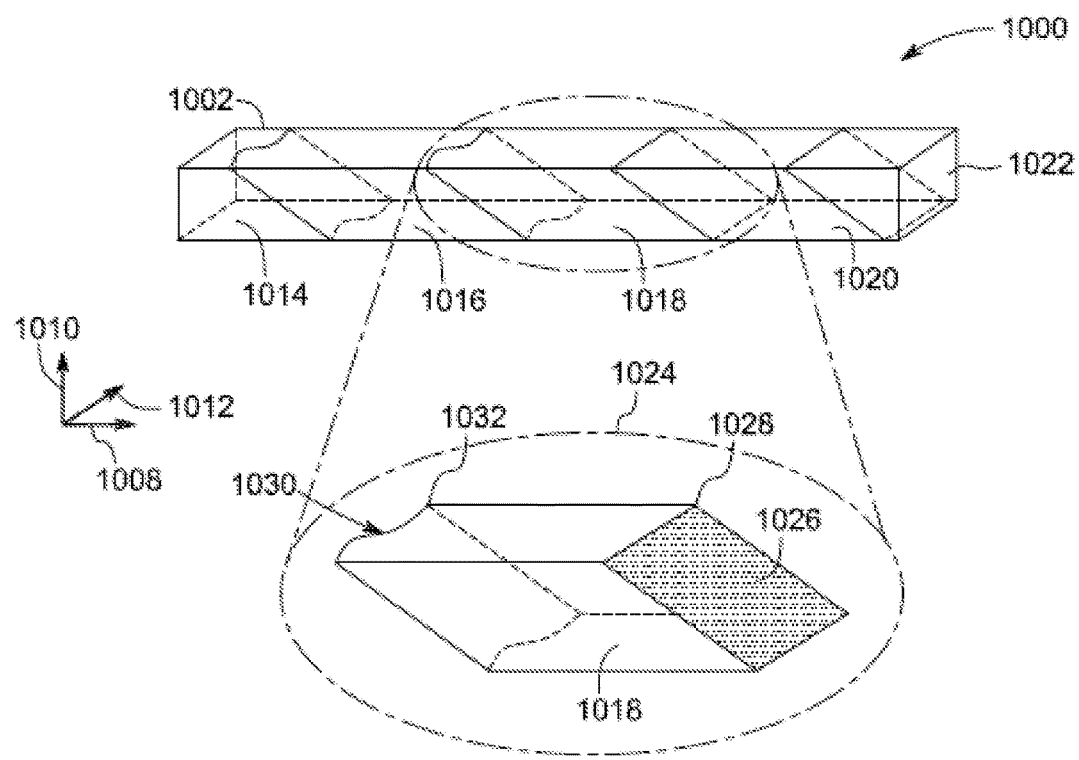
FIG. 10 is a three-dimensional diagrammatic representation of another embodiment of a permanent magnet assembly for use in an electric machine, in accordance with aspects of the present specification.

Turning now to FIG. 10, a 3D diagrammatic representation 1000 of another embodiment of a permanent magnet assembly 1002 is presented, in accordance with aspects of the present specification. The permanent magnet assembly 1002 may be configured for use in the electric machines 100, 200, or 300 (see FIGS. 1-3). The permanent magnet assembly 1002 is characterized by an axial direction 1008, a radial direction 1010, and a tangential direction 1012. The axial, radial, and tangential directions 1008, 1010, 1012 are similar to the corresponding directions depicted in FIGS. 1-3. Further, the permanent magnet assembly 1002 may be representative of one embodiment of the permanent magnet assemblies 122, 218, 328 respectively of FIGS. 1, 2, and 3.

In a presently contemplated configuration, the permanent magnet assembly 1002 may include two or more permanent magnets 1014, 1016, 1018, 1020, and 1022 (hereinafter referred to as permanent magnets 1014-1022). The permanent magnets 1014-1022 are arranged serially along the axial direction 1008 of the electric machine such that adjacently disposed permanent magnets 1014-1022 overlap one another at an overlapped interface (i). More particularly, the adjacently disposed permanent magnets 1014-1022 overlap one another such that the overlap spans (i.e., spreads across) at least two laminates (see FIGS. 4B and 6B).

In the embodiment of FIG. 10, mating surfaces of one or more permanent magnets of the permanent magnets 1014-1022 may be oriented in a different fashion. For example, while mating surfaces of the permanent magnet 1016 are oriented at non-zero angles with respect to the axial, radial, and tangential directions 1008, 1010, 1012, the mating surfaces of the permanent magnet 1020 are oriented at non-zero angles with respect to only the axial and radial directions 1008, 1010.

In some embodiments, while one mating surface of a given permanent magnet is oriented at non-zero angles with respect to the axial, radial, and tangential directions 1008, 1010, 1012, other mating surface of the given permanent magnet may be oriented at non-zero angles with respect to any two of the axial, radial, and tangential directions 1008, 1010, 1012. For ease of illustration of this embodiment, one permanent magnet 1018 of the permanent magnet assembly 1002 is shown in an enlarged view 1024. In the enlarged view 1024, the permanent magnet 1018 is shown as having two mating surfaces—a first mating surface 1026 at a first end 1028 and a second mating surface 1030 at a second end 1032. The embodiment of FIG. 10, the first mating surface 1026 is similar to the first mating surface 512 of the permanent magnet 418 of FIG. 5. More particularly, the first mating surface 1026 is oriented at non-zero angles with respect to the axial and radial directions 1008 and 1010. Moreover, the second mating surface 1030 is similar to the second mating surface 830 of the permanent magnet 818 of FIG. 8. In this example, the second mating surface 1030 is oriented at non-zero angles with respect to the axial, radial, and tangential directions 1008, 1010, 1012.

In each of the embodiments depicted in FIGS. 8-10, the permanent magnets (814-820, 914-920 and 1014-1020) can be magnetized and cut such that an attractive magnetic force is produced at the overlapped interface (i) that exceeds any repulsive force. Polarizing and shaping the permanent magnets to produce an attractive force between adjacent permanent magnets at the overlapped interface (i) further reduces the presentation of lateral forces in the plane extending orthogonally to the axial direction (808, 908. 1008). Regardless of whether a net attractive magnetic force is present at the overlapped interface (i), the plurality of laminates in proximity to the overlapped interface (i) would oppose lateral forces produced at the junction between the permanent magnets (814-820, 914-920 and 1014-1020).

Figure 11:
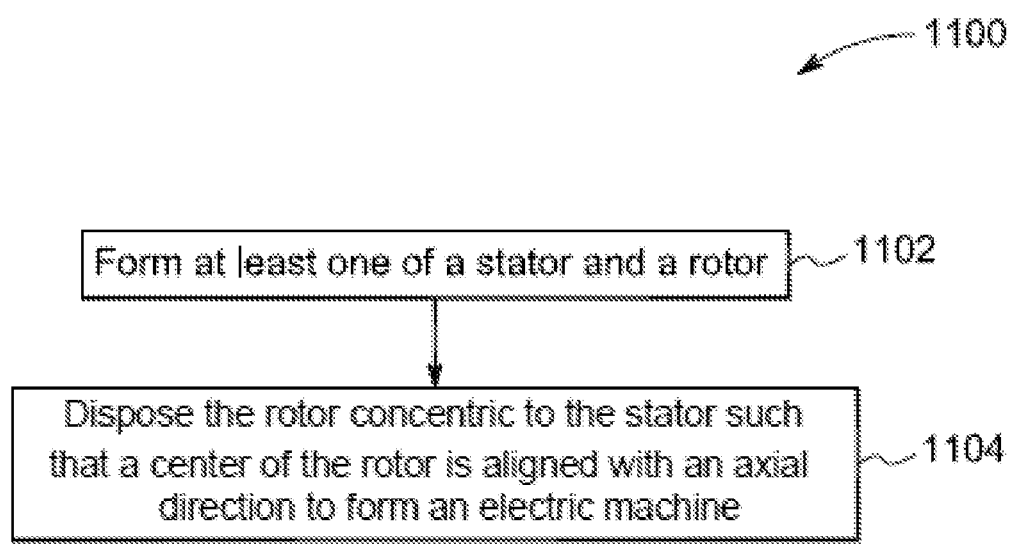
FIG. 11 is a flowchart of an example method of manufacturing an electric machine, in accordance with aspects of the present specification.

FIG. 11 is a flowchart 1100 of an example method of manufacturing an electric machine such as the radial field electric machines 100, 200, or 300, in accordance with aspects of the present specification. The method 1100 is described with reference to the components of FIGS. 1-3.

At step 1102, at least one of a stator such as the stators 108, 208, or 310 and a rotor such as the rotors 110, 210, 312 is formed. Steps for forming the stator and/or rotor are described in greater detail with reference to FIG. 12. Once the stator and rotor are formed, the rotor may be disposed concentric to the stator such that a center of the rotor is aligned with an axial direction such as the axial directions 102, 202, or 302 to form an electric machine, as indicated by step 1104. In some embodiments, the stator may be disposed such that the rotor is surrounded by the stator. In some other embodiments, the rotor may be disposed such that the stator is surrounded by the rotor.

Figure 12:
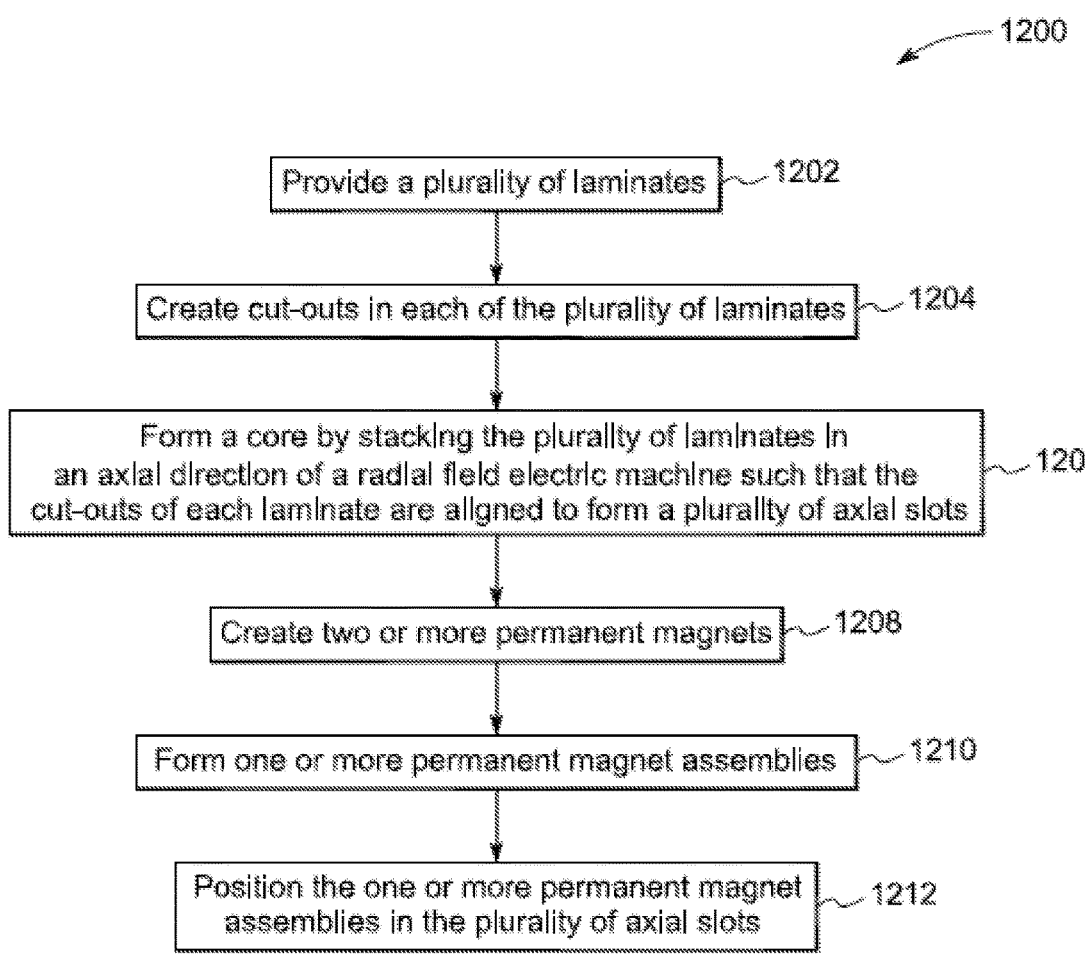
FIG. 12 is a flowchart of an example method of forming at least one of a stator and a rotor, in accordance with aspects of the present specification.

Turning now to FIG. 12, a flowchart 1200 of an example method of forming at least one of a stator and a rotor, in accordance with aspects of the present specification, is presented. In particular, the flowchart 1200 represents various sub-steps of step 1102 of FIG. 11.

At step 1202, a plurality of laminates, such as the laminates 124, 220, 324 are provided. Thereafter, at step 1204, cut-outs such as the cut-outs 128, 222 are created in each of the plurality of laminates. In some embodiments, the cut-outs may be created by selectively removing portions from each of the plurality of laminates. Some examples of techniques used for the selective removal of portions of the laminates include, but are not limited to, cutting away, pressing, punching, etching, and the like.

Moreover, at step 1206, a core such as the rotor cores 120, 216, or the stator core 320 is formed by stacking the plurality of laminates in an axial direction of the electric machine. The laminates may be stacked such that the cut-outs in each of the laminates are aligned to form a plurality of axial slots in the core. In some embodiments, the plurality of axial slots is created by disposing the plurality of laminates such that the cut-outs of one laminate are aligned with respective cut-outs of other laminates thereby forming a plurality of cavities that defines the plurality of axial slots.

Furthermore, two or more permanent magnets (for example, the permanent magnets 414-422, 614-620, 814-822, 914-920, or 1014-1022) are created as indicated by step 1208. In some embodiments, each of the permanent magnets is created such that the permanent magnet includes a first mating surface at a first end and a second mating surface at a second end of the permanent magnet. In one embodiment, at least one of the first mating surface and the second mating surface is oriented at a non-zero angle with respect to the radial and axial directions of the electric machine (see FIGS. 4-5). In other embodiments, at least one of the first mating surface and the second mating surface is oriented at a non-zero angle with respect to the axial and the tangential directions of the electric machine (see FIGS. 6-7). In certain other embodiments, at least one of the first mating surface and the second mating surface is oriented at a non-zero angle with respect to the axial, radial, and the tangential directions of the electric machine (see FIGS. 8-10). In other embodiments, one of the first mating surface and the second mating surface is oriented at a non-zero angle with respect to two of the axial, radial, and tangential directions of the electric machine, while the other of the first mating surface and the second mating surface is oriented at a non-zero angle with respect to the axial, radial, tangential directions.

Furthermore, at step 1210, a permanent magnet assembly such as the permanent magnet assembly 402, 602, 802, 902, or 1002 may be formed. The permanent magnet assembly includes two or more permanent magnets. The two or more permanent magnets are stacked end-to-end to form the permanent magnet assembly of a determined length. As previously noted, the permanent magnets of similar or different lengths may be employed to form the permanent magnet assembly. In some embodiments, the permanent magnet assembly may be formed by disposing the two or more permanent magnets serially along the axial direction of the electric machine such that the first mating surface of one permanent magnet overlaps with the second mating surface of an adjacent permanent magnet, as depicted in FIGS. 5 and 7. More particularly, the two or more permanent magnets may be disposed serially along the axial direction of the electric machine such that an overlapped interface (i) between adjacent permanent magnets spans at least two laminates, as depicted in FIGS. 4B and 6B.

In addition, at step 1212, the permanent magnet assembly may be positioned in one or more of the plurality of axial slots. One example of positioning the permanent magnet assembly may include inserting the permanent magnet assembly in one or more of the plurality of axial slots. In some other embodiments, the permanent magnet assembly may be positioned in one or more of the plurality of axial slots by inserting the permanent magnets one after another in respective axial slots. Consequent to the processing of steps 1202-1212, an exemplary rotor and/or a stator is formed.

Any of the foregoing steps may be suitably replaced, reordered, or removed, and additional steps may be inserted, depending on the needs of a particular application.

Figure 13:
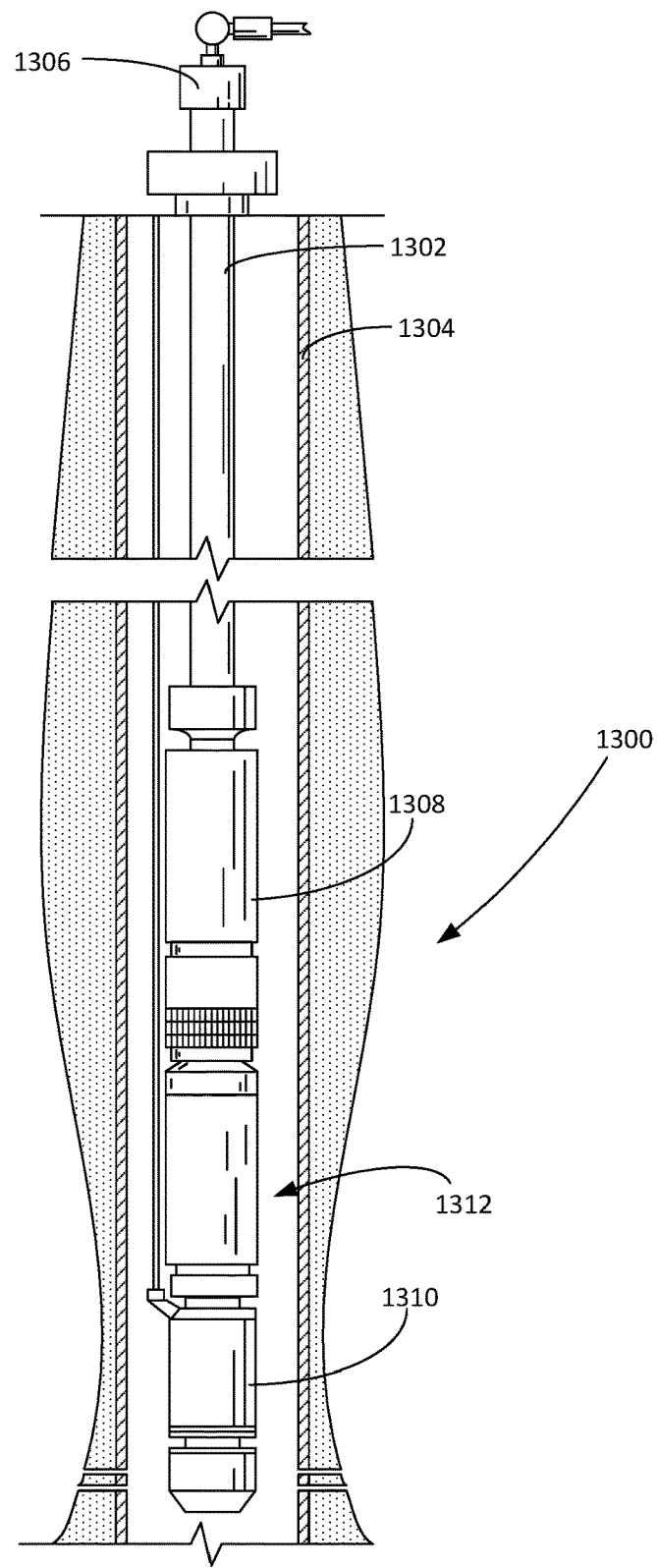
FIG. 13 is a diagrammatic representation of an electric submersible pump (ESP) employing an electric machine, in accordance with aspects of the present specification.

FIG. 13 is a diagrammatic representation of an electric submersible pumping system 1300 attached to production tubing 1302. The pumping system 1300 and production tubing 1302 are disposed in a wellbore 1304, which is drilled for the production of a fluid such as water or petroleum. As used herein, the term "petroleum" refers broadly to all mineral hydrocarbons, such as crude oil, gas and combinations of oil and gas. The production tubing 1302 connects the pumping system 1300 to a wellhead 1306 located on the surface. Although the pumping system 1300 is primarily designed to pump petroleum products, it will be understood that the present invention can also be used to move other fluids. It will also be understood that, although each of the components of the pumping system are primarily disclosed in a submersible application, some or all of these components can also be used in surface pumping operations.

It will be noted that although the pumping system 1300 is depicted in a vertical deployment in FIG. 13, the pumping system 1300 can also be used in non-vertical applications, including in horizontal and non-vertical wellbores 1304. The pumping system 1300 includes a pump 1308, a motor 1310 and a seal section 1312.

The motor 1310 is an electrical motor such as the electric machine 100, 200, 300, constructed in accordance with aspects of the present specification. When energized, the motor 1310 drives a shaft that causes the pump assembly 1308 to operate. The seal section 1312 accommodates the expansion of motor lubricants during operation while isolating the motor 1310 from the wellbore fluids passing through the pump assembly 1308. Although only one of each component is shown, it will be understood that more can be connected when appropriate. It may be desirable to use tandem-motor combinations, multiple seal sections, multiple pump assemblies or other downhole components not shown in FIG. 13. For example, in certain applications it may be desirable to place a seal section 1312 below the motor 1310.

The exemplary electric machine topologies described hereinabove provide electric machines with enhanced mechanical strength. In particular, the exemplary topology of the permanent magnet assemblies disposed in the rotor and/or stator contributes to the enhanced design of the electric machine. More specifically, each permanent magnet in a given permanent magnet assembly is structured such that an overlap between the adjacently disposed permanent magnets spans at least two laminates of the rotor or stator in which the permanent magnet assembly is disposed in. Moreover, as the overlap spans at least two laminates, a lateral force arising from any mechanical movement of the permanent magnets about the overlap is transferred to at least two laminates. Advantageously, this distribution of the force of the mechanical movement of the permanent magnets results in a lower impact on the two laminates that support the overlap in comparison to a butt joint typically used in a traditional configuration where the overlap is supported by a single laminate. Additionally, the improved mechanical strength of the electric machine aids in prolonging the useful life to the electric machine.

It will be appreciated that variants of the above disclosed and other features and functions, or alternatives thereof, may be combined to create many other different applications. Various unanticipated alternatives, modifications, variations, or improvements therein may be subsequently made by those skilled in the art and are also intended to be encompassed by the following representative embodiments.

It is claimed:

1. An electric machine having substantially orthogonal axial, radial and tangential directions, the electric machine comprising:
   a stator;
   a rotor disposed concentric to the stator such that a center of the rotor is aligned along the axial direction of the electric machine; wherein at least one of the rotor and the stator comprises:
   a core comprising a plurality of laminates stacked along the axial direction of the electric machine, wherein the stacked plurality of laminates defines a plurality of axial slots; and
   a permanent magnet assembly disposed in one or more of the plurality of axial slots, wherein the permanent magnet assembly comprises two or more permanent magnets disposed serially in the axial direction of the electric machine such that adjacently disposed permanent magnets overlap one another, and wherein the overlap between the adjacently disposed permanent magnets spans at least two laminates of the plurality of laminates of the core.

2. The electric machine of claim 1, wherein the stator is disposed such that the rotor is surrounded by the stator.

3. The electric machine of claim 1, wherein the rotor is disposed such that the stator is surrounded by the rotor.

4. The electric machine of claim 1, wherein each permanent magnet of the two or more permanent magnets comprises a respective first end and second end along the axial direction of the electric machine, wherein the first end comprises a first mating surface and the second end comprises a second mating surface, wherein the two or more permanent magnets are disposed serially along the axial direction of the electric machine such that the first mating surface of one permanent magnet overlaps with the second mating surface of an adjacent permanent magnet to form an overlapped interface.

5. The electric machine of claim 4, wherein at least one of the first mating surface and the second mating surface is oriented at a non-zero angle with respect to the radial direction and the axial direction of the electric machine.

6. The electric machine of claim 4, wherein at least one of the first mating surface and the second mating surface is oriented at a non-zero angle with respect to the tangential direction and the axial direction of the electric machine.

7. The electric machine of claim 4, wherein at least one of the first mating surface and the second mating surface is oriented at a non-zero angle with respect to the axial direction, the radial direction, and the tangential direction of the electric machine.

8. The electric machine of claim 4, wherein one of the first mating surface and the second mating surface is oriented at a non-zero angle with respect to two of the axial direction, radial direction, and tangential direction of the electric machine, and the other of the first mating surface and the second mating surface is oriented at a non-zero angle with respect to the axial direction, the radial direction, and the tangential direction.

9. The electric machine of claim 4, wherein at least one of the first mating surface and the second mating surface is a contoured surface, a uniform surface, or a combination thereof.

10. The electric machine of claim 4, wherein at least one of the first mating surface and the second mating surface is a chamfer formed along a plane defined by the axial direction and a radial direction of the electric machine.

11. The electric machine of claim 4, wherein at least one of the first mating surface and the second mating surface is a chamfer formed along a plane defined by the axial direction and a tangential direction of the electric machine.

12. The electric machine of claim 4, wherein each permanent magnet of the two or more permanent magnets is magnetically polarized and shaped such that the two or more permanent magnets exhibit a net attractive magnetic force at the overlapped interface.

13. The electric machine of claim 4, wherein each permanent magnet of the two or more permanent magnets is magnetically polarized and shaped such that the two or more permanent magnets exhibit a net repulsive magnetic force at the overlapped interface.

14. The electric machine of embodiment 1, wherein the overlap between the adjacently disposed permanent magnets spans the at least two laminates of the plurality of laminates such that a mechanical movement at the overlap between the adjacently disposed permanent magnets is distributed amongst the at least two laminates of the plurality of laminates of the core.

15. The electric machine of embodiment 1, wherein the electric machine is a radial field electric machine, an axial field electric machine, or a transverse field electric machine.

16. A method of manufacturing an electric machine, comprising:
    forming at least one of a stator and a rotor, comprising:
        creating one or more cut-outs in each of a plurality of laminates;
        forming a core by stacking the plurality of laminates in an axial direction of the electric machine such that the one or more cut-outs in each of the plurality of laminates are aligned to form a plurality of axial slots in the core;
        forming a permanent magnet assembly by arranging serially, along an axial direction of the electric machine, two or more permanent magnets such that adjacently disposed permanent magnets overlap one another to create an overlapped interface, wherein the overlapped interface between the adjacently disposed permanent magnets spans at least two laminates of the plurality of laminates of the core;
        positioning the permanent magnet assembly in one or more of the plurality of axial slots; and
        disposing the rotor concentric to the stator such that a center of the rotor is aligned with the axial direction of the electric machine to form the electric machine.

17. The method of claim 16, further comprising a step of creating at least one of the first mating surface at the first end and the second mating surface at the second end of each permanent magnet such that at least one of the first mating surface and the second mating surface is oriented at a non-zero angle with respect to one or more planes selected from a group of planes consisting of an axial-radial plane, an axial-tangential and a radial-tangential plane.

18. An electric submersible pump, comprising:
    a pump; and
    an electric motor operatively coupled to the pump, wherein the electric motor comprises:
        a stator;
        a rotor disposed concentric to the stator such that a center of the rotor is aligned along an axial direction of the electric machine; and
        wherein at least one of the rotor and the stator comprises:
        a core comprising a plurality of laminates stacked along the axial direction of the electric machine, wherein the stacked plurality of laminates defines a plurality of axial slots; and
        a permanent magnet assembly disposed in one or more of the plurality of axial slots, wherein the permanent magnet assembly comprises two or more permanent magnets disposed serially along the axial direction of the electric machine such that adjacently disposed permanent magnets overlap one another to form an overlapped interface that spans at least two laminates of the plurality of laminates of the core.

19. The electric submersible pump of embodiment 18, wherein each permanent magnet of the two or more permanent magnets is magnetically polarized and shaped such that the two or more permanent magnets exhibit a net attractive magnetic force at the overlapped interface.

* * * * *